(12) United States Patent
Kielsnia

(10) Patent No.: US 6,449,363 B1
(45) Date of Patent: Sep. 10, 2002

(54) SAFETY TILT MECHANISM FOR PORTABLE TELEPHONE INCLUDING A SPEAKERPHONE

(75) Inventor: Jean-Phillipe Kielsnia, San Diego, CA (US)

(73) Assignee: Denso Corporation (JP)

(*) Notice: Subject to any disclaimer, the term of this patent is extended or adjusted under 35 U.S.C. 154(b) by 0 days.

(21) Appl. No.: 09/437,330

(22) Filed: Nov. 9, 1999

(51) Int. Cl.[7] ............................................... H04M 1/00
(52) U.S. Cl. ............................ 379/420.01; 379/433.02
(58) Field of Search ............................ 379/420, 420.01, 379/420.02, 433.02

(56) References Cited

U.S. PATENT DOCUMENTS

| | | | | |
|---|---|---|---|---|
| 5,224,151 A | * | 6/1993 | Bowen | 379/420 |
| 5,898,908 A | * | 4/1999 | Griffin | 379/420 |
| 6,115,620 A | * | 9/2000 | Colonna | 379/420 |

* cited by examiner

Primary Examiner—Ahmad F. Matar
Assistant Examiner—Rasha Al-Aubaidi
(74) Attorney, Agent, or Firm—Fish & Richardson P.C.

(57) ABSTRACT

A portable telephone with a speakerphone with a safety mechanism. This portable telephone is prevented from entering speakerphone mode unless the device is within a predetermined amount of horizontal. Otherwise, speakerphone mode cannot be entered.

2 Claims, 2 Drawing Sheets

SAFETY TILT MECHANISM FOR PORTABLE TELEPHONE INCLUDING A SPEAKERPHONE

BACKGROUND

Telephones can often operate in two modes: a normal mode where the earpiece of the telephone is brought up to the user's ear, and a speakerphone mode in which the telephone becomes more sensitive to sounds, and produces its output volume at a higher level output volume. In the speakerphone mode, the telephone speaker produces much higher volume so the sounds can be heard at a distance.

In a desktop telephone, the speakerphone often uses a different speaker than the one normally used for the handset.

On a portable phone, however, the same speaker may be used for both the speakerphone mode and for the handset mode. Since the speaker produces much more volume during the speaker mode, an unintentional attempt for the user to put the speakerphone-mode-telephone up to ones ear could cause hearing discomfort or permanent hearing damage.

SUMMARY

The present system enables using a speakerphone in a portable phone by a safety mechanism that only allows the speakerphone mode to be entered when the portable phone is in the specified position.

According to a disclosed mode, that specified position is either at horizontal or within 10° of horizontal. Once the phone is maintained in this position for 1–3 seconds, speakerphone mode is enabled. The inventor recognizes that it is unlikely that a user would use a non-speakerphone in horizontal or close to horizontal position. Therefore, it is unlikely that this position would be used during normal speaking.

DESCRIPTION OF THE PREFERRED EMBODIMENTS

Figure 1:
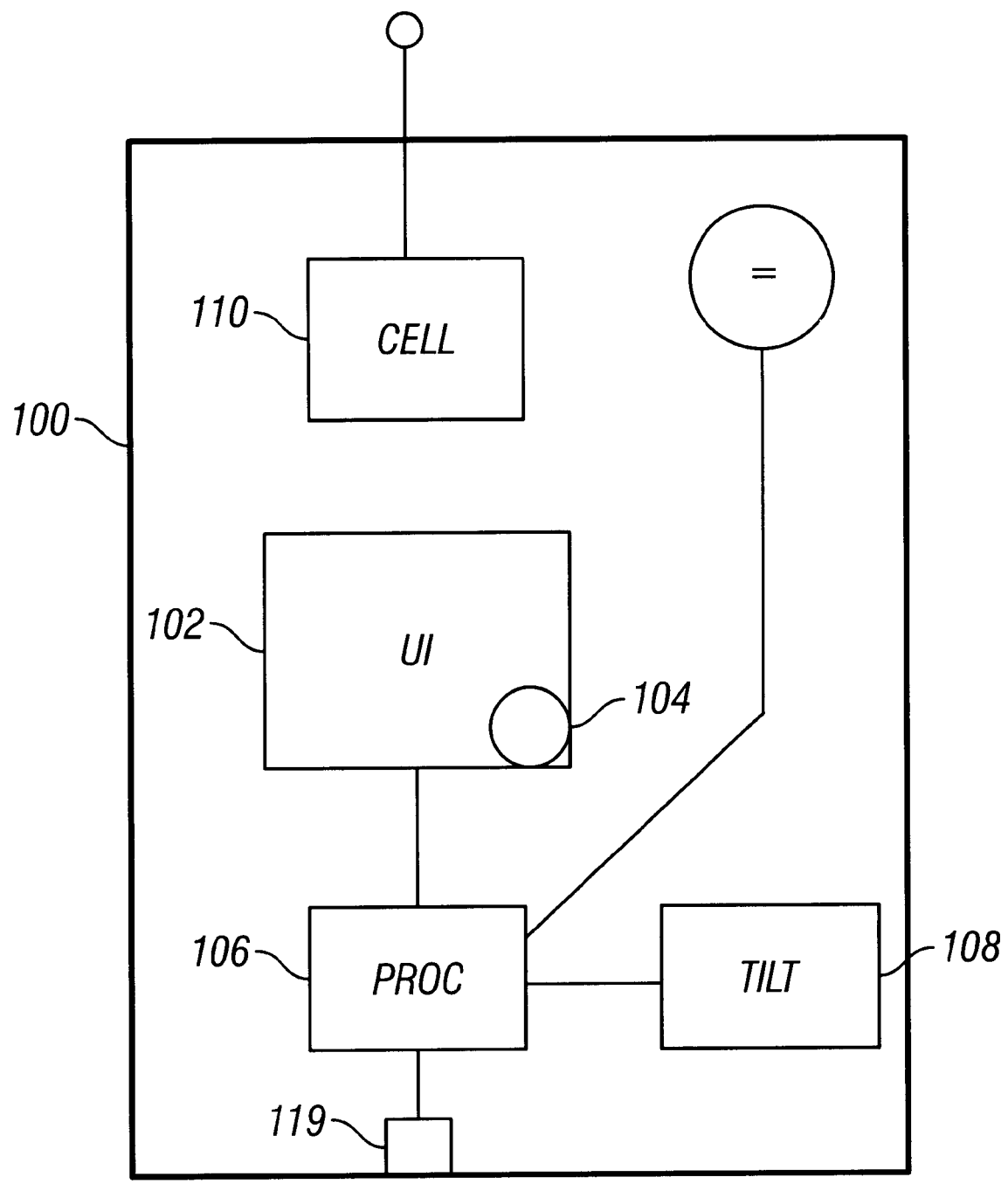
FIG. 1 shows a block diagram of an exemplary phone.

An embodiment is shown in FIG. 1. A portable phone 100 includes a user interface 102 which among other things has a speakerphone control indication 104. This can be a dedicated actuation button, or can be selected from the menu. The user interface is controlled by a processor 106 within phone 100. A tilt sensor 108 detects the position of orientation of the phone. These tilt sensors are commonly used in joysticks and computer equipment.

The processor also controls certain operations of the cellular transceiver using cellular electronics 110 to transmit and receive. The cellular electronics 110 can operate in an IS-95 mode.

Figure 2:
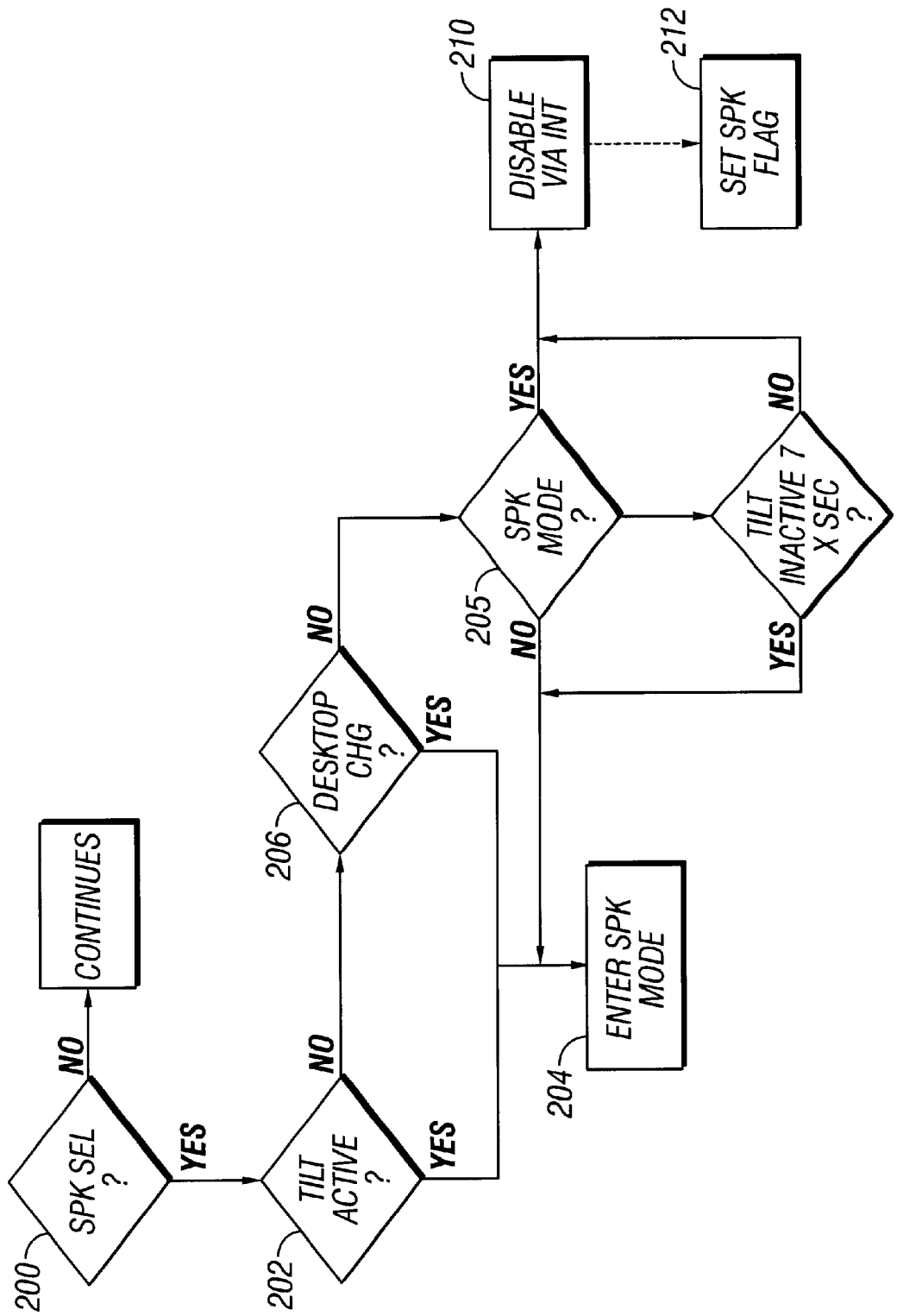
FIG. 2 shows a flowchart of operation of the phone.

The processor runs the routine shown in FIG. 2 to enter speakerphone mode. Step 200 shows entering the routine by selection of the speakerphone mode. This selection can be from a menu, or from a dedicated speakerphone key.

If speakerphone mode is not selected, then the operation continues with the rest of the main loop that is conventionally executed by the processor.

If speakerphone mode is selected, the system first checks the tilt sensor 108. The phone is taken to be in the proper tilt orientation when the phone is in the specified position, here within 10° of horizontal. If properly tilted at step 202, then the processor is commanded to enter speakerphone mode at step 204.

If tilt is not found to be active at step 202, the first step determines if the phone is in the desktop charger. The presence on the desktop charger is detected by detecting a specified current through a specified contact 119 on the telephone which is reserved only for desktop chargers. If so, then it is unlikely the user's ear is placed up to the phone, and the speakerphone mode is enabled.

The speakerphone mode is effected by commanding the audio amplifier to produce a higher output mode to the speaker. In this way, more volume is produced by the speaker and presented,to the user. Optionally, the microphone can also be amplified by a higher gain, to facilitate speakerphone mode.

If the phone is not in the desktop charger or properly tilted, then a test is made at step 208 to determine if the phone is already in speakerphone mode. If so, speakerphone mode is disabled e.g. by an interrupt at step 210. If the phone is not in speakerphone mode 208, no action is taken. An optional step shown in FIG. 2 sets the speakerphone flag after step 212 to indicate that the phone was in speakerphone mode. Once the speakerphone flag is set, a later detection of the proper tilt or presence in the desk charger will automatically cause the phone to enter the speakerphone mode.

If the system is found to be in speakerphone mode at step 208, step 209 tests to see if tilt has been inactive for more than x seconds where x is preferably between 1 and 3. If so, then the speakerphone is disabled via interrupt. If not, control returns so that no action is taken. This prevents bounce operations for example, when the speakerphone is on the table and the table is shaken. This could otherwise cause bouncing in the contact of the tilt sensor.

In addition, picking up the phone to look at the display, for example, could end the speakerphone mode. According to this system, a certain amount of time is provided for actions such as these. In this way, the speakerphone mode persists even when the phone is moved.

Although only a few embodiments have been disclosed in detail above, those with ordinary skill in the art certainly understand that modifications are possible in the preferred embodiment. All predictable modifications are intended to be encompassed within the following claims.

What is claimed is:

1. A portable telephone device comprising:

a housing;

telephone electronics, located within said housing and enabling said telephone to send and receive calls;

a user interface, including a speakerphone-requesting interface portion;

a condition sensor, which senses a predetermined condition of said telephone that indicates that the phone is in a condition that makes it unlikely to be pressed against a user's ear; and a processor, responsive to said user interface and said condition sensor, and enabling said phone to enter said speakerphone mode only when said condition sensor indicates that said phone is in said predetermined condition, wherein said condition sensor includes a tilt sensor, which senses a predetermined tilted orientation of said telephone, wherein said processor detects loss of said predetermined tilted orientation after speakerphone mode is entered, and removes the telephone from said speakerphone mode responsive to said detection; and wherein said portable phone is removed from speakerphone mode only when said tilt sensor condition persists for a specified time greater than one second.

2. A method of operating a portable telephone, comprising:

detecting a specified orientation of the portable telephone;

allowing said portable telephone to enter speakerphone mode only when in a specified condition, wherein said specified condition includes orientation within a predetermined amount of horizontal; and detecting loss of said predetermined tilted orientation, and removing said portable phone from speakerphone mode after detecting said loss of said predetermined orientation for a specified period of time greater than one second.

* * * * *